Figure 1:
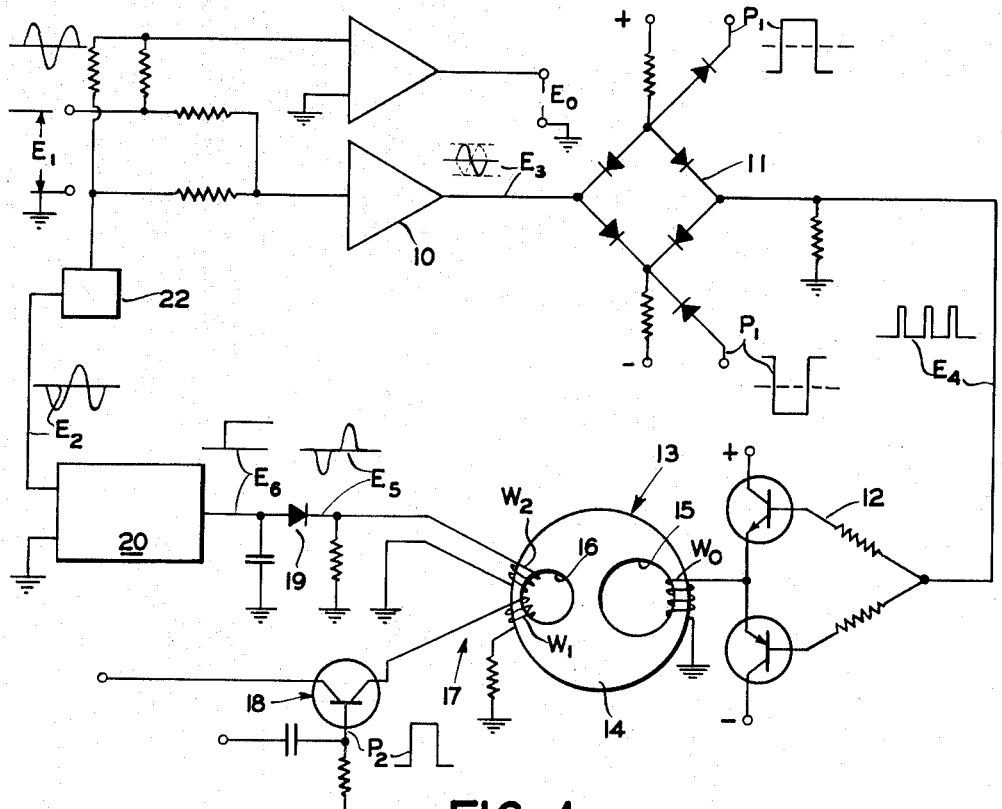

Nov. 30, 1965   A. S. ROBINSON ETAL   3,221,175

TRANSFLUXOR SYNCHRONIZER

Filed Feb. 12, 1960

INVENTORS
ARTHUR S. ROBINSON
DAVID H. BLAUVELT
WILLIAM H. LASCH
BY Charles J. Worth
AGENT

United States Patent Office 3,221,175
Patented Nov. 30, 1965

3,221,175
TRANSFLUXOR SYNCHRONIZER
Arthur S. Robinson, Allendale, David H. Blauvelt, Ridgewood, and William H. Lasch, Hasbrouck Heights, N.J., assignors to the Bendix Corporation, a corporation of Delaware
Filed Feb. 12, 1960, Ser. No. 8,318
4 Claims. (Cl. 307—88)

This invention relates to automatic flight control systems for aircraft and more specifically to synchronizers for providing signals to maintain the system at null when the aircraft is flown manually, and to prevent transients when the craft is returned to automatic control. This invention is an improvement of the invention embodied in the copending patent application Serial No. 8,317, filed February 12, 1960, and assigned to the assignee of this patent application.

Heretofore, electromechanical servo systems were used for this purpose, but these systems were slow to respond and added considerable weight to the aircraft. A typical synchronizer using electromechanical components is shown and described in U.S. Patent 2,589,834, issued March 18, 1952. Electrical systems were also tried, but were of limited value because of short memory characteristics. These electrical systems were also slow to respond.

An object of this invention is to provide a synchronizer for an aircraft control system and no moving parts and which is relatively light in weight, compact in structure and rugged.

Another object of this invention is to provide an electrical synchronizer which is responsive to alternating voltage command signals and has infinite memory and nondestructive readout characteristics.

This invention contemplates a synchronizer adapted to receive alternating voltage command signals and has means for providing control pulses for a transfluxer which is included as a memory device and has its output connected to the synchronizer input by means for producing alternating voltage signals to oppose the command signals.

The foregoing and other objects and advantages of the invention will appear more fully hereinafter from a consideration of the detailed description which follows, taken together with the accompanying drawing wherein a single embodiment of the invention is illustrated by way of example. It is to be expressly understood, however, that the drawing is for illustration purposes only and is not to be construed as defining the limits of the invention.

Figure 2:
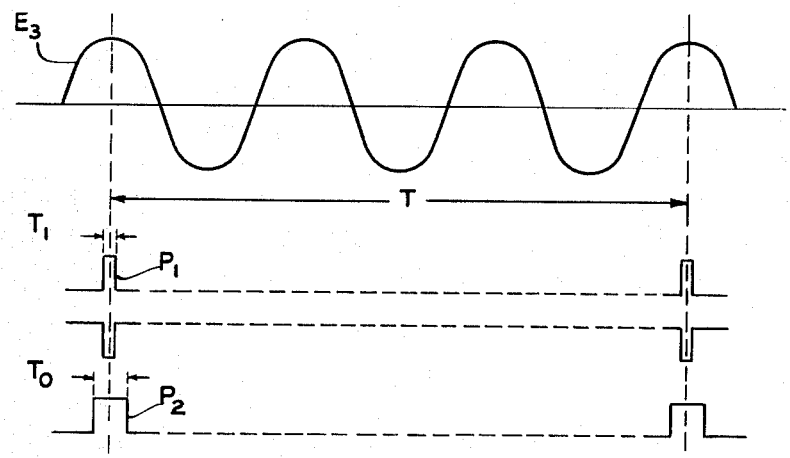

FIGURE 1 is a schematic view of a novel synchronizer constructed according to the invention, and, FIGURE 2 illustrates the relation of the various pulses and an error signal to each other.

Referring now to FIGURE 1, alternating voltage command signals $E_1$ are presented to the input of the synchronizer. The synchronizer generates alternating voltage feedback signals $E_2$ which are provided at its output to oppose the command signals $E_1$ such that resulting modified command signals $E_0$ approach a null. The synchronizer comprises an input line to receive signals $E_1$ and $E_2$ that are presented to an error amplifier 10 having an alternating voltage output $E_3$ which represents the amplified instantaneous difference between the signals $E_1$ and $E_2$. The amplified error signals $E_3$ are presented to and peak sampled by an electronic gate 11 controlled by keying pulses $P_1$ to provide pulse signals $E_4$ having an amplitude and polarity as defined by the alternating voltage signals $E_3$. The pulses $E_4$ are received by a low impedance voltage drive circuit 12 which applies voltage pulses to a control winding $W_0$ of a transfluxor 13. The transfluxor 13 has a magnetic core 14 with two openings 15 and 16 therein. The control winding $W_0$ is associated with and controls the magnetization around the opening 15 in the core 14. Each voltage pulse received by the control winding $W_0$ induces a current pulse greater than the threshold magnetizing force which incrementally varies the magnetization of the transfluxor 13.

An alternating current excitation is presented to the transfluxor 13 by a circuit 17, including the primary winding $W_1$ of the transfluxor 13, to create an alternating secondary flux around the opening 16 in the transfluxor core 14. A secondary winding $W_2$ is associated with the opening 16 and is excited by the secondary flux. The induction from the primary winding $W_1$ to the secondary winding $W_2$ is controlled by the control flux induced in the transfluxor core 14 by the pulse signals which are received by the control winding $W_0$. The resulting distorted alternating voltage signals $E_5$ from the winding $W_2$ are peak detected by a circuit 19. The direct voltage output $E_6$ of the detector circuit 19 is presented to a modulator 20. The alternating voltage $E_2$ from the modulator 20 is fed back by the synchronizer output line to the error amplifier 10 and to the command signal transmission line between the terminals receiving signal $E_1$ and providing signal $E_0$. An electronic switch 22 may be provided in the synchronizer output line to disconnect the synchronizer feedback during automatic flight control operation. This switch 22 together with the termination of pulses $P_1$ to gate 11 completely disconnects the synchronizer and prevents the magnetization level of transfluxor 13 from being varied.

When the transfluxor 13 is used as a memory device in a synchronizer, it is desirable to maintain accurately the magnetization of the transfluxor core 14 at the termination of the pulse signal which has established this magnetization. Although synchronizing operation may be accomplished if the gate 11 were closed throughout synchronization, the magnetization would not be maintained perfectly when it was opened. To obtain this desired stable characteristic, the gate 11 is included in the synchronizer to provide a pulse control in which the pulse width is small in comparison to the pulse interval. The pulse width and the pulse interval of the pulse signals $E_4$ are controlled by the keying pulses $P_1$ which are presented to the electronic gate 13. This will be more clearly understood by referring to FIGURE 2. It has been determined that when the keying pulses $P_1$, which having existence $T_1$ of $3\mu$ seconds, are applied to the gate 11 at a pulse interval T of $8,000\mu$ seconds, the magnetization of the transfluxor core 14 remains constant when the pulse signals which have established this magnetization terminate. The foregoing time constants are merely illustrative and are not to be construed as defining the limits of the invention.

When the synchronizer generates feedback signals $E_2$ which are substantially equal and opposite to the command signals $E_1$, the transfluxor 13 will receive no further pulse signals capable of varying the magnetization of the core 14. As long as the alternating current signals from the circuit 17 remain constant, the alternating voltages $E_2$ will remain constant. This is due to the memory or nondestructive readout of the transfluxor 13.

In some instances, when the control winding $W_0$ and the primary winding $W_1$ are excited simultaneously, spurious overshoots will be induced in the output signals $E_5$ of the transfluxor 13. To prevent this interaction, an electronic gate 18 may be included in the circuit 17. Gate-out pulses $P_2$ are applied to the gate 18 to interrupt the excitation of the primary winding $W_1$ concurrently with the keying pulse $P_1$. Each gate-out pulses $P_2$ has an existence $T_0$ which is slightly longer than the existence $T_1$ of each keying pulse $P_1$.

Although but a single embodiment of the invention has been illustrated and described in detail, it is to be ex-

We claim:

1. A synchronizer having an input adapted to receive alternating voltage command signals, means connected to the input for peak sampling the alternating voltage command signals and providing pulses corresponding thereto, a transfluxor, means connecting the peak sampling means to the transfluxor for applying the pulses to the transfluxor to magnetize the transfluxor in accordance therewith and provide signals at the output of the transfluxor corresponding to the magnetization of the transfluxor, means for connecting the output of the transfluxor in opposition to the synchronizer input for applying the signals from the transfluxor in opposition to the command signals, and an output receiving the opposed signals.

2. A synchronizer according to claim 1 in which the pulse means provides pulses having a pulse width which is small in comparison to the pulse interval.

3. A synchronizer according to claim 1 in which the connecting means includes a voltage drive circuit for applying the pulses to the transfluxor so that the magnetization varies incrementally in response to each of the pulses.

4. A synchronizer according to claim 1 in which a gate is connected between an energizing source and the transfluxor to prevent the transfluxor from producing signals concurrently with the pulses.

References Cited by the Examiner

UNITED STATES PATENTS

| | | | |
|---|---|---|---|
| 2,803,812 | 8/1957 | Rajchman et al. | 340—174 |
| 2,884,622 | 4/1959 | Rajchman | 340—174 |
| 2,911,629 | 11/1959 | Wetzstein | 340—174 |
| 2,990,540 | 6/1961 | Sublette | 340—174 |

IRVING L. SRAGOW, *Primary Examiner.*

EVERETT R. REYNOLDS, JOHN F. BURNS,
*Examiners.*